Jan. 1, 1957 S. G. BART 2,776,254
RUBBER BONDING PROCESS
Filed Sept. 7, 1950

INVENTOR.
SIEGFRIED G. BART
BY
Warren S. Orton
ATTORNEY

United States Patent Office 2,776,254
Patented Jan. 1, 1957

2,776,254

RUBBER BONDING PROCESS

Siegfried G. Bart, Essex Fells, N. J.

Application September 7, 1950, Serial No. 183,595

4 Claims. (Cl. 204—20)

The invention relates in general to a rubber bonding process in the art of forming multi-layered, sandwiched material of the type in which a layer of metal is deposited electrolytically on a layer of rubber for use wherever such multi-layered materials are suitable, and the invention specifically relates to the art of forming aeroplane propeller blades and similar aerofoils built up by forming such multi-layered material on basic rigid forms or cores.

With reference to the rubber bonding feature of the disclosure, it is noted that many attempts have been made heretofore to deposit metal electrolytically on rubber, but these attempts have not proven entirely satisfactory in actual practice. For instance, applicant has experimentally dipped different basic forms made of materials such as plastics, aluminum, magnesium, etc., in baths of different kinds of rubber and also of synthetic rubber mixtures, hereinafter sometimes generically referred to as rubber-like material; has cured by means of heat the rubber or rubber-like material so coating the different materials; and has allowed the cured rubber to cool. The rubber-formed surface was then softened more or less with a rubber solvent, such as alkane-sulfonic acid, or with mixtures of potassium sulfides in carbon disulphide. Graphite was then sprinkled or dusted on the tacky rubber surface so chemically softened and the graphite-covered rubber was subjected to the action of an electrolytic bath containing nickel or copper and operated conventionally to coat the rubber with a layer of electro-metal. While this method formed a metal-faced rubber-backed article which functioned satisfactorily for a time, the outer electrolytic layer did eventually blister and in time raised in spots and broke away from the rubber. In those cases where the multi-layered bodies so formed were subjected to stresses and strains such as are present in aeroplane propellers, the blistering and breaking away soon became prevalent and as a result the article had but a short life under actual service conditions. Quite obviously, the defect in articles so fabricated lay in the fact that the electrolytic metal was not permanently or sufficiently bonded to the rubber.

The primary object of the invention then is to provide an improved technique in the forming of such multi-layered materials by means of which the layer of electrolytically deposited outer shell-forming metal will remain either permanently bonded to the underlying rubber or at least bonded for a much longer period than was possible when the above outlined method was practiced.

Broadly, this objective is attained, first, by utilizing two kinds of rubber-containing material, one a relatively thin layer of a bonding rubber free of sulphur, such as chlorinated rubber cement, applied to the basic core, and superposing thereon a relatively thick layer of an initially uncured rubber, for instance, neoprene rubber cement likewise free of sulphur and in depth sufficient to act as a cushioning layer; and, second, by subjecting the two layers of rubber considered as a two-layered rubber-like unit to a two-stage curing process. In this curing process the first step consists in heating the two layers of rubber containing cements in an oven at a temperature of about 150 degrees F. to effect a preliminary curing of the rubber and to drive out all solvents in the rubber and then, assuming the rubber has been coated with graphite or equivalent cathode-forming conductive material, the graphite-covered and partially cured rubber is subjected to the action of an electrolytic bath operative at a temperature of about 125–150 degrees F., but not above 150 degrees F., to complete the curing of the rubber and at the same time to deposit thereon from the bath a layer of electro-metal. The oven heating of the rubber even for a short time caused at least its outer exposed surface to become soft and tacky.

The exposed surface of the partially cured rubber in its tacky condition was found to be a most effective type of surface to receive and retain the graphite, in that the graphite when dusted lightly on the semi-soft surface remained in place exactly where located by the operator and, due to the high degree of adhesion between the graphite particles and the soft rubber surface, resisted the effects of the electrolyte while flowing or otherwise agitated to displace the graphite, especially the fine graphite commonly used in forming cathode surfaces on articles in an electrolytic bath. Also, when the graphite was applied with the last coat of rubber, as hereinafter described, the graphite equally adhered to the rubber in a uniformly dispersed layer or otherwise as set by the operator. It was also found that a less amount of graphite was needed to form the conductive surface on the tacky rubber than had been necessary when graphite had heretofore been applied to the more or less hard surfaces of plastics, wood and other non-rubber surfaces to form conductive-cathode surfaces on such materials.

This method was particularly developed in the process of perfecting aeroplane propeller blades of the type wherein it is required that the body portion or inner core be formed of cast aluminum or equivalent light material; whose outer surface is to meet aerodynamic requirements in that it should be defined by a smooth, continuous, uninterrupted skin of electrodeposit metal, and wherein it is required that between the core and skin there be a thin layer of rubber functioning as a cushion and effectively bonded to both the core and skin to form the propeller as an integral, unitary, one-piece article.

It has been known to form the outer, air-beating surfaces of propellers at least in part of sheet steel laid on wood and of chromium plating on steel, but it is difficult to shape the steel exactly to the aerodynamic configuration now demanded of propeller blade designs and under severe operating conditions chromium plating on steel has a tendency to develop minute cracks and eventually disintegrates in service.

Depositing nickel electrolytically, especially when deposited on rubber as herein featured, provides a one-piece outer layer or skin to the propeller blade which does not need to be preformed as in the case of the steel facings and does not crack or chip as does the chromium and, on the contrary, provides a smooth hard surface, particularly at its leading edge and wherever else there is required a surface highly resistant to the abrading and erosive effect of water, sand and other solids often present in the air.

While aeroplane propellers are usually considered to be rigid bodies actually they are preferably required to save some small degree of flexibility in certain parts and relative rigidity in other parts. For instance, the leading and trailing edges, as well as the tips, are usually required to be rigid, more or less, while parts therebetween forming the camber surfaces should possess at least a slight degree of flexure. Also, in aeroplane propeller blades and similar aerofoils there is greater wear, especially at the leading edge and tip and, accordingly, the present disclosure features a peculiar apportioning of the electro-metal which forms the outer skin to provide for relatively thick cross section of material and for greater density of material and thus for a greater hardness of material at the leading and trailing edges and at the tips, and a relatively thin and more flexible cross section of material in that part of the skin which forms the camber portions of the blade. Briefly, this is attained in the instant case by employing two directives in the process, first, by using as the electrolyte in the nickel plating bath a Watts solution with addition of saccharine to form a stress-free nickel, and, second, by using a high plating current density disposed to build up and thus thicken the nickel deposited on the narrow edges forming the leading and trailing edges and on the converging surfaces outlining the tips of the blade.

Various other objects of the method aspects of the disclosure and of the resulting novel form of aeroplane propeller blade herein selected as an illustration of one embodiment of the physical aspect of the invention will be obvious from a consideration of the accompanying drawing in which.

Figure 1:
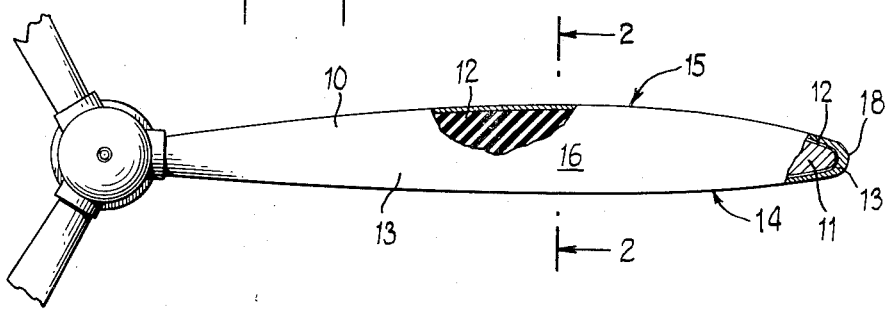
Fig. 1 is a view in plan of an aeroplane propeller blade of conventional design fabricated by following the method herein featured and forming a preferred embodiment of the article aspect of the invention, a portion of the outer metal shell being removed to show the underlying rubber-containing layer and a portion of the metal tip is shown in section in the plane of the blade.
Figure 2:
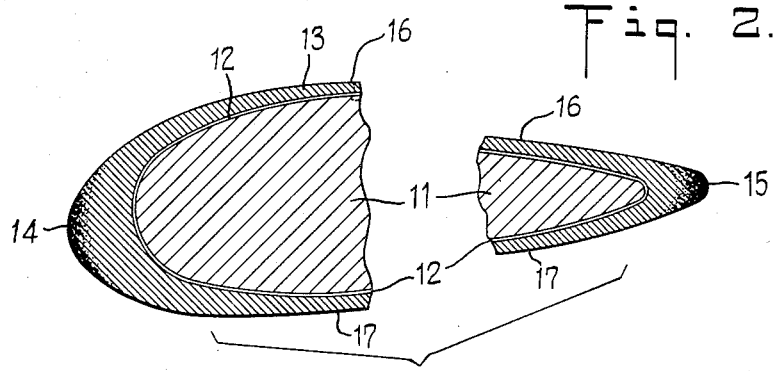
Fig. 2 is a transverse sectional view taken on the line 2—2 of Fig. 1, somewhat enlarged, with the midportion broken away to save space and with the layers shown approximately in their relative dimensions.
Figure 3:
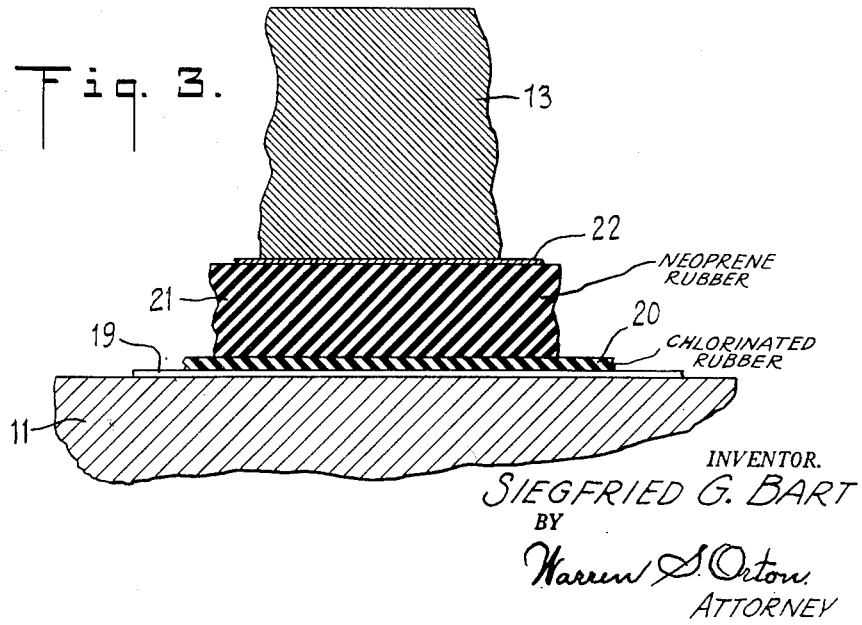
Fig. 3 is a very much enlarged sectional showing on a scale of about 1 to 5000 of the several layers of material including the two initial layers of rubber which eventually become the single layer of rubber, in the blocked-off portion outlined by dotted lines at the upper central portion of the finished blade, as shown in Fig. 2.

The finished blade 10 as shown in Fig. 1 is of conventional design and as shown in Fig. 2 includes an inner core 11 forming the base on which a rubber backing layer 12 is formed as herein featured, and on which rubber layer an outer layer or shell 13 of electrolytically deposited nickel is formed. The blade when completely formed is provided with a relatively thick leading edge 14 rounding in a vertical plane as shown in Fig. 2 on a relatively large radius and a relatively thin trailing edge 15 similarly rounding on a relatively small radius. Between the leading and trailing edges the blade provides an upper camber-forming surface 16 and a lower camber-forming surface 17 merging at their ends into a tip 18 as is usual in propeller blades. The inner core or base 11 in this case is preformed of forged or cast aluminum and of such size and contour so that when the different layers are added thereto as hereinafter described there will be produced the finished blade with its desired size, configuration and structural strength to respond to approved aerodynamic requirements of such blades. While forged aluminum has been selected because of its light weight, cheapness and other desirable properties, it is suggested that the core may be made of other metals, or may even be made of wood or plastics.

In practicing the method herein featured it is necessary that the exposed surface of the aluminum core must be cleared of all adhering grease and other foreign matter. To obtain the necessary cleanliness it is suggested that the core surface be anodized as by treating it in an acid bath of an electrolytic cell with the current reversed.

A thin layer of plastic bonding material 19, of which several suitable types are on the market and most of them containing a phenol-formaldehyde base, is applied to the cleaned surface of the aluminum core. Such a bonding product manufactured for this purpose under the trade-name "Reonite," has been used with success. The bonding material is applied in several coats and permitted to dry between succeeding coats. The core so coated is baked with infra-red heat in an oven for about one hour and at a temperature of about 150 degrees F., and then removed from the oven. This plastic layer 19 provides a protective coating to the aluminum and adheres well to the same.

Three or four coats of chlorinated or bonding rubber cement free of sulphur and with a suitable solvent are then sprayed onto the plastic bonding material so baked on the core with about fifteen minutes of air drying between the application of each coat to remove the solvent and to leave a thin, rubber-containing, base-coating bonding layer 20 of chlorinated rubber, in the illustrated case having a thickness of about 0.0005 of an inch.

Seven to twenty coats of neoprene (polychloroprene) rubber cement which does not require any sulphur for curing are then sprayed on the bonding layer 20 with air drying between succeeding coats to form a relatively thick cushioning neoprene rubber cement layer 21, in the illustrated case having a thickness of about 0.004 of an inch. Neoprene rubber cement as it appears on the market contains, in addition to its rubber content, carbon black, zinc oxide, magnesia and certain other ingredients in small proportions.

In those cases where the neoprene rubber cement or equivalent cushion-forming, rubber-like material will adhere to whatever material may be used to form the core 11, the bonding layer 20 may be omitted.

This neoprene rubber cement so used contains an accelerator such as magnesium oxide (MgO)—magnesia— which is present in about two percent and is operative to facilitate the aging of the rubber and to toughen the neoprene to a rubber-like mass within the relatively short period of heating time employed in practicing the curing steps herein featured. The two layers of rubber thus eventually forming the all-rubber backing layer 12 are then given a preliminary, that is, an incomplete or partial curing by baking the core so rubber-coated in an oven for about two and one-half hours at a temperature of about 150 degrees F. On removal from the oven and thus while the rubber is hot and tacky, at least on its exposed surface, a layer 22 of graphite is dusted onto the surface of the rubber to form a continuous layer of a cathode-forming material. While graphite is suggested, other cathode-forming conductive materials such as powdered metal may be used.

It is suggested that, in place of dusting the graphite onto the surface to form the layer 22, the graphite be added to the last coat of the sprayed layer 21 mixed into the same preferably in amounts of two to ten percent of graphite to the rubber in this last coating. This, of course, eliminates layer 22 as a distinctive all-graphite layer.

The rubber-coated core so dusted with graphite or faced with a thin graphite-containing film is positioned within the electrolyte of an electrolytic cell containing nickel and the cell caused to function conventionally so that eventually the rubber-coated core 11 is enclosed in a one-piece, continuous skin or shell 13 of electrolytic nickel deposited by means of a current of high depositing density and otherwise following conventional practices in this respect. In order that the deposited nickel layer be free of stress and form the same as bright nickel, an additional agent such as saccharine is added to the electrolyte of the Watts type to make of it a modified Watts solution. While nickel is suggested as the preferred metal to form the outer shell 13, it is suggested that the shell may be formed of two electro-metals, for instance, an inner layer of copper and an outer layer of nickel, or it may be formed of a metal harder than nickel, such as tungsten, titanium, molybdenum, or alloys which can be plated. It is suggested that the outer shell 13 be electroformed iron with a chromium plate.

It is a distinctive feature of this disclosure that the electrolytic bath be maintained at a temperature ranging between 125 degrees and 165 degrees F., preferably nearer 150 than 125 degrees F., for ten to twenty hours while depositing its nickel. This final heat treatment in the bath has the effect of completing the curing of the neoprene rubber cement and apparently effects a curing of the chlorinated rubber, for the entire layer 12 appears to have its strength improved by the curing process herein featured. During the metal-depositing step the bath is heated as by means of steam pipes and care is exercised to keep the bath not materially greater than 150 degrees F., for a temperature materially greater than 150 degrees F. tends to destroy the adhesive qualities of the rubber, and if more than 150 degrees F. is used the time the rubber is exposed to such temperature should be quite brief.

The resulting, completely cured rubber layer 12 thus formed by the amalgamation of the rubber-containing layers 20 and 21 forms a tough, resilient rubber bond with an improved adhesion to both the aluminum core and the resulting outer nickel shell over anything which has been found heretofore. Neoprene rubber cement does not adhere well to the plastic layer 19 and this is the reason for using the chlorinated layer 20 therebetween. As the plastic bonding material 19 adheres to the basic aluminum core 11, as the first layer of chlorinated rubber adheres to the bonding material 19, as each layer of rubber is bonded to the next preceding layer, and as the final electro-metal is bonded to the neoprene rubber cement it follows that each superposed layer is bonded to the layer next beneath it and thus the rubber completely fills the space between the inner core and the outer shell and there is formed, in effect, a one-piece laminated sandwich material. Over an extensive period of use even under conditions where there was much vibration of the resulting product, for instance, in the propeller, the nickel covering adhered tenaciously to the rubber and no blisters or raised spots formed.

The nickel skin covering 13 formed as herein featured in forming the propeller is neither homogeneous nor of equal cross section of material in its several parts. By reason of the narrowed edges provided by the sharply rounded leading edge 14 and the even more sharply rounded trailing edge 15 there will be a tendency of the bath in its normal operation to form a denser deposit of nickel on the narrow edges than on the more flat camber-forming surfaces 16 and 17. Also, by arranging a selective deposition of the anodes in the bath relative to the cathode surfaces and following known controls in this respect, there is presented first by the graphite-coated surface, and subsequently by the successive deposits of the nickel and, if necessary by the use of selective masking processes, a deposition of the nickel which can be regulated to obtain a relatively thin cross section of material at the camber-forming surfaces and a very much increased cross section of material in those parts which form the leading and trailing edges and the tip.

In one embodiment of the invention the nickel skin 13 of the camber-forming parts 16 and 17 was formed to a depth of about eight to ten-thousandths of an inch. Despite the fact that the skin is formed of nickel, its extreme thinness tends to give a certain degree of ductility and flexibility to the blade considered as a whole, and particularly in its mid-width portion, which thus provides a hinge effect along the longitudinal medial plane of the blade midway between the leading and trailing edges. On the contrary, the body of nickel which forms the leading edge 14 is quite thick, massive, rigid and harder than the body of nickel which defines the upper and lower camber-forming parts. The body forming the shell 13 has a thickness in the line of thrust of the propeller blade of from ten to eighty-thousandths of an inch, depending on the use to which the propeller blade is to be put, and in any case merging from its thick leading edge with progressive reduction in thickness smoothly into the camber-forming parts at top and bottom of the blade. A maximum thickness of nickel at the leading edge of about forty-thousandths of an inch is found to be ideal for propellers and for similar forms of aerofoils.

While the abrasive wear on the trailing edge is not as great as on the leading edge of propellers, it is suggested that the nickel in the part which forms the trailing edge likewise be made thicker, more rigid, denser and thus harder along the line of thrust than in the camber-forming parts, and likewise merge with gradually reduced cross section of metal into the thin, camber-forming parts. In the illustrated case the maximum thickness of nickel at the trailing edge is slightly less than is the thickness of metal in the leading edge.

In general, the propeller blade presents an external, continuous, air-engaging surface formed of a skin of tough, strain-free nickel free of projections of any kind and which skin as it is deposited electrolytically can be made to give an air-beating surface which can be formed accurately to the minute dimensions of aerodynamic specifications. Being of electrolytically formed nickel the exposed surface has the resistance to wear which characterizes hard bright nickel and in the part thereof most likely to wear in time, such as the edges and tips, even the hard nickel is made more dense, thus harder and thus more resistant to wear than the other parts, such as the camber-forming surfaces where at least a slight degree of flexibility is desired. Propeller blades formed as herein featured have a materially longer life and have other aerodynamic advantages over all known forms of similar types of propeller blades.

I claim:

1. In the art of fabricating a propeller blade and to give aerodynamic form and abrasive resistant qualities to the finished blade which includes a rugged core functioning mainly to give strength and basic form to the blade, the method which consists in spraying onto the core a plastic bonding material, baking the plastic-coated core in an infra-red oven for about one hour at a temperature not over 150 degrees F., applying a relatively thin coat of chlorinated bonding rubber cement free of sulphur to the plastic-coated core and permitting the bonding rubber to dry in place, applying a relatively thick coat of neoprene rubber cement free of sulphur and thus uncured to the bonding rubber cement layer to form a cushioning layer and permitting the neoprene rubber cement to dry, baking to dry out any solvents present in the rubber cements and to give the rubber cements a preliminary curing, while the neoprene rubber cement is still warm and tacky applying thereto a coating of graphite and subjecting the core so covered with graphite-coated tacky rubber to electrolysis in an electrolytic bath containing nickel, at a temperature of between 125 degrees F. and 150 degrees F. to complete the curing of the rubber cements and at the same time to cause a layer of electrolytic nickel to form on the resulting tough, resilient rubber bond and to form an all-nickel skin covering defining and giving the requisite aerodynamic form to the exposed sides of the finished propeller blade.

2. The method which consists in applying a plurality of coats of chlorinated rubber cement free of sulphur to a previously cleaned core surface to form thereon a layer of bonding material, superposing on the bonding layer a plurality of coats of neoprene rubber cement free of sulphur and uncured to form a cushioning layer, in each case air-drying each coating before the next coating is applied, subjecting the core surface with its two layers of rubber cement to a heat treatment of about 150 degrees F. to effect a partial curing of both of the layers of rubber cement, placing a conductive coating on the surface of the neoprene rubber cement and subjecting the core surface with its rubber cement layers so partially cured to electrolysis in an electrolytic bath containing a metal taken from the following group: nickel, copper, tungsten, titanium, molybdenum, iron and chromium, and functioning to deposit a layer of electro-metal on the neoprene rubber cement and at the same time maintaining the electrolytic bath at a temperature greater than 125 degrees F. and not materially greater than 150 degrees F. to effect a complete curing of the rubber cement.

3. In the art of forming an article coated with an outer layer of an electro-deposited metal backed with a cushioning layer of cured rubber, the method which consists in positioning on the article a first layer of a chlorinated rubber cement free of sulphur, air-drying the first layer, positioning on the first layer a relatively thick layer of neoprene rubber cement, uncured and free of sulphur, heating the two layers of rubber-containing cements to effect a preliminary curing of the rubber in both layers, applying electro-conductive material to an exposed surface of the preliminarily cured rubber, and subjecting the same to electrolysis in an electrolytic bath containing a metal taken from the following group: nickel, copper, tunsten, titanium, molybdenum, iron and chromium while operating the bath at a temperature of about 125–165 degrees F. to cause the two layers of the cement to adhere, to deposit a layer of the metal electrolytically on the resulting rubber cement in bonding relation thereto and simultaneously completing the curing of the rubber cement of both layers while in the bath.

4. The method defined in claim 3, wherein the operation of the bath continues for from ten to twenty hours and wherein the neoprene rubber cement contains magnesium oxide as an accelerator to facilitate the aging of the rubber and to toughen the neoprene to a rubber-like mass within said ten to twenty hours.

References Cited in the file of this patent

UNITED STATES PATENTS

| | | |
|---|---|---|
| 10,586 | Meyer | Feb. 28, 1854 |
| 25,273 | Marcy | Aug. 30, 1859 |
| 266,110 | Jule et al. | Oct. 17, 1882 |
| 694,658 | Meurant | Mar. 4, 1902 |
| 889,807 | Reynolds | June 2, 1908 |
| 971,641 | Rice et al. | Oct. 4, 1910 |
| 1,248,151 | Mott | Nov. 27, 1917 |
| 1,329,735 | Wicker | Feb. 3, 1920 |
| 1,384,308 | De Giers | July 12, 1921 |
| 1,385,802 | St. John | July 26, 1921 |
| 1,838,674 | Heath | Dec. 29, 1931 |
| 1,843,886 | Semmes | Feb. 2, 1932 |
| 2,514,196 | Bradley | July 4, 1950 |
| 2,551,342 | Scholl | May 1, 1951 |